April 9, 1957 R. P. DAVIE, JR 2,788,020
WIND TUNNEL NOZZLE ADJUSTMENT LINKAGE
Filed Sept. 16, 1954 2 Sheets-Sheet 2
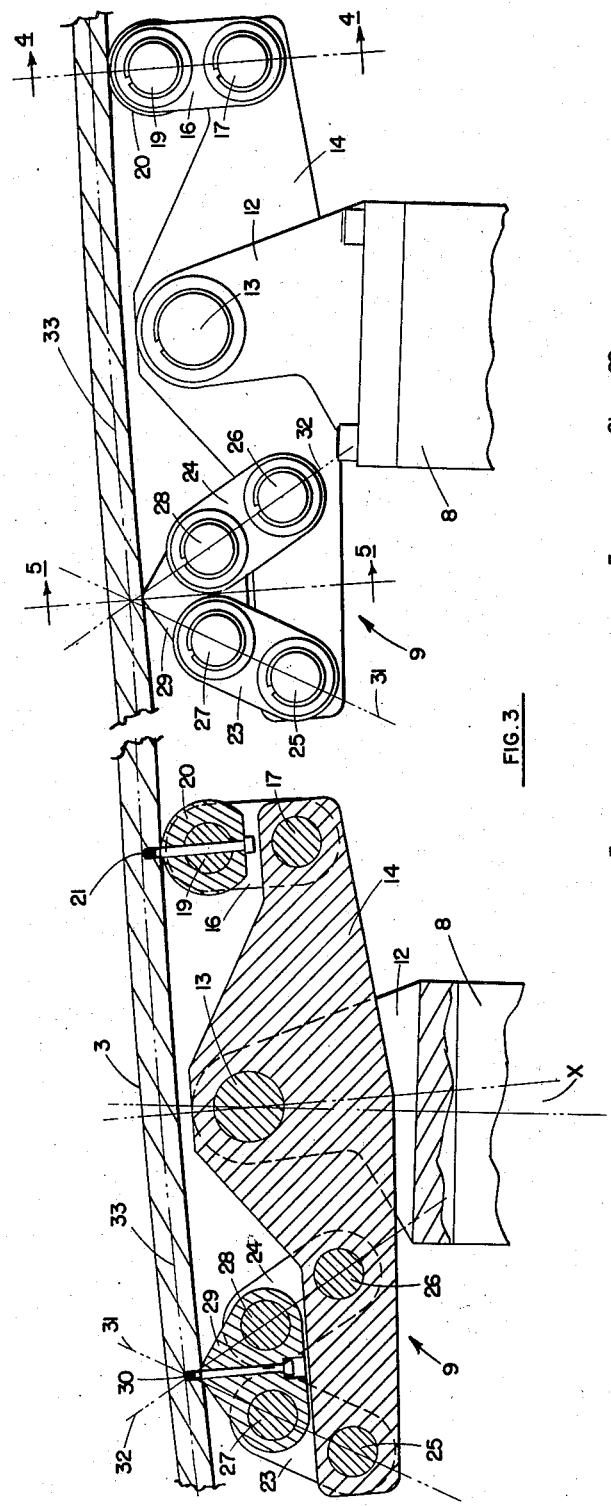
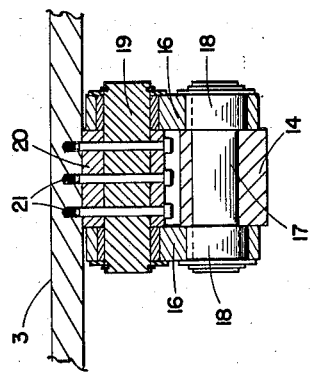
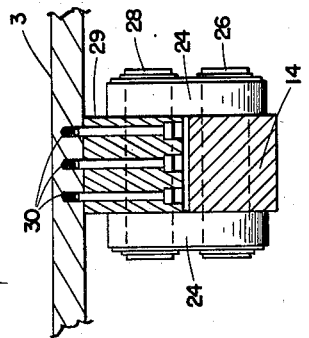
INVENTOR.
ROBERT P. DAVIE, JR.
BY
*William R. Lane*
ATTORNEY

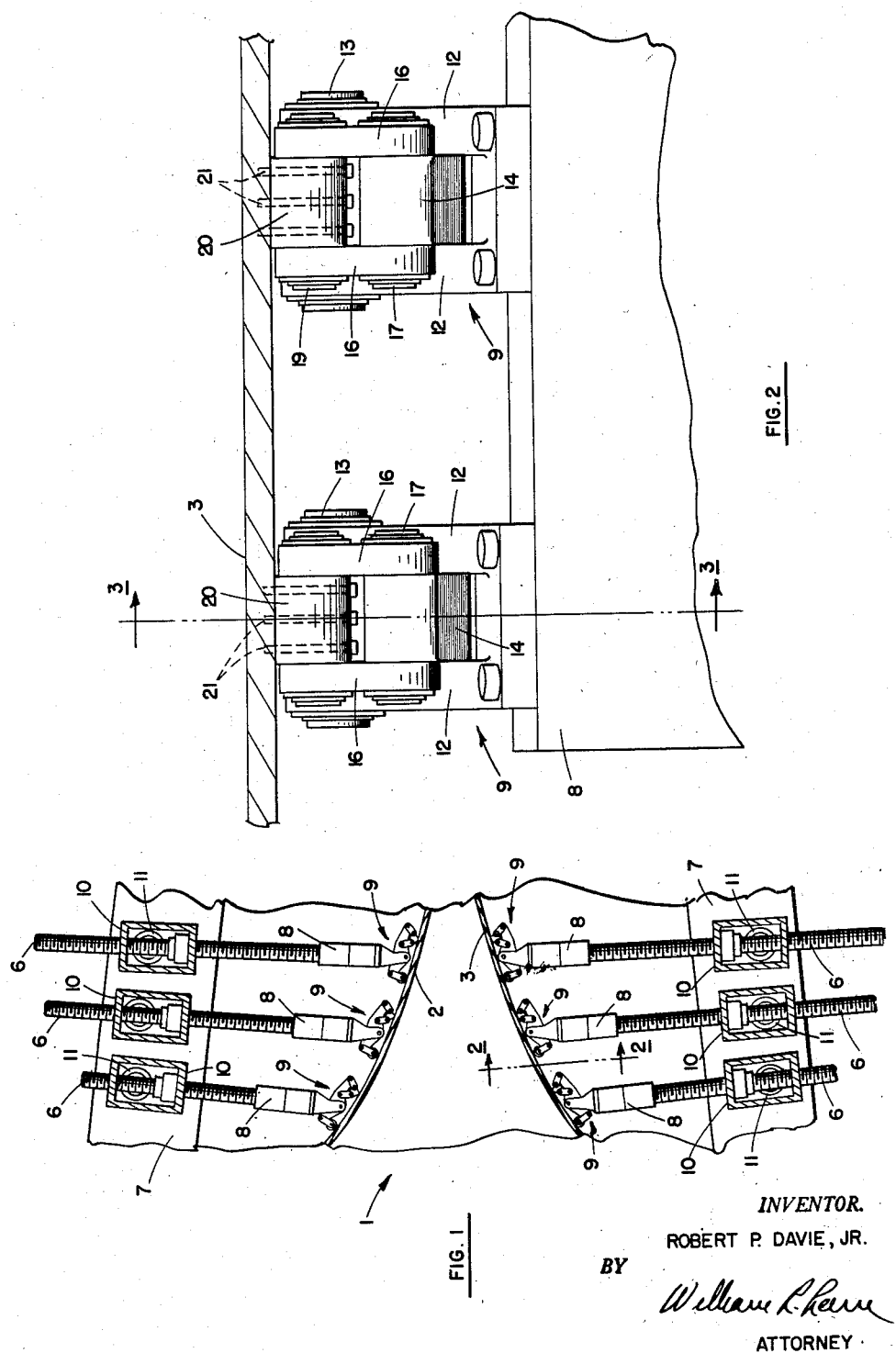

United States Patent Office 2,788,020
Patented Apr. 9, 1957

2,788,020

WIND TUNNEL NOZZLE ADJUSTMENT LINKAGE

Robert P. Davie, Jr., Manhattan Beach, Calif., assignor to North American Aviation, Inc.

Application September 16, 1954, Serial No. 456,535

6 Claims. (Cl. 138—45)

This invention pertains to a linkage for effecting adjustment of a wind tunnel nozzle and more particularly to a linkage to be associated with a nozzle having movable, flexible walls.

In modern wind tunnel design where a wide range of Mach numbers is required, it is necessary to provide a means for varying the contour of the nozzle of the wind tunnel so that the desired air velocities may be obtained. This may be accomplished by providing the wind tunnel with two fixed walls and two oppositely disposed flexible walls which can be changed in contour by a suitable means so that the nozzle can be given various shapes. A series of spaced jacks, for example ball bearing screw jacks, may be connected at intervals along the outer surface of the flexible walls for effecting the adjustment required. The jacks will necessarily pivot relative to the walls as the wall contour is changed, and a satisfactory connection must be provided between the jacks and the walls to permit this movement and to impart a force to the walls for changing and holding the contour thereof.

In the past the connection between the jacks and the walls has been accomplished by means of lugs welded to the walls connecting through a suitable linkage with the ends of the jacks. This type of arrangement has certain disadvantages. The fact that weld is employed requires walls of considerable thickness. Additionally with the types of steel which are used for flexible walls of this sort the welds are of insufficient strength to withstand the forces imposed thereon for a tunnel of large size permitting high Mach number airflow. The use of welded lugs also requires extra machining operations.

It has been recognized that a screw-type lug arrangement would be desirable in overcoming some of the disadvantage of the welded connection but efforts to provide a usable design of this sort have been unsuccessful. This is because the relative tilting between the walls and the jacks will provide a bending in the screws which results in high stresses therein, a partial failure of the threads and a consequent loosening of the screws. Also in connection with these efforts screws of large diameter and a relatively thick wall were necessary to withstand the bending moments. According to this invention, however, a linkage is provided which permits the use of screw-type lug connection overcoming the objections noted with both the previous screw-type connections and the welded lug arrangements.

Therefore, it is an object of this invention to provide a wind tunnel wall adjusting linkage permitting a screw type of lug connection with the wall.

Another object of this invention is to provide a wind tunnel wall linkage connection permitting a thin, highly flexible wind tunnel wall, and necessitating a minimum of machining.

A further object of this invention is to provide a wind tunnel wall linkage arrangement of the screw type permitting the use of small size screws.

An additional object of this invention is to provide a wind tunnel wall linkage arrangement wherein local bending moments at the point of attachment to the wall are eliminated.

A still further object of this invention is to provide a flexible wall wind tunnel linkage arranged so that lateral forces are absorbed through the neutral axis of the wall.

These and other objects will become apparent from the following detailed description taken in connection with the accompanying drawings in which Fig. 1 is an elevational view, partially in section, of a flexible wind tunnel nozzle;

Fig. 2 is an enlarged fragmentary sectional view of the linkage connection taken along line 2—2 of Fig. 1;

Fig. 3 is a sectional view, partially in elevation, taken along line 3—3 of Fig. 2;

Fig. 4 is a sectional view of the single link connection taken along line 4—4 of Fig. 3 and Fig. 5 is a sectional view of the double link connection taken along line 5—5 of Fig. 3.

Referring to the drawing there is illustrated in Fig. 1 a typical wind tunnel arrangement wherein a nozzle 1 is provided with two fixed walls and two opposite flexible walls 2 and 3.

The latter two walls are adapted to assume a simple convergent form for producing subsonic air velocities, or to provide a convergent-divergent shape whereby supersonic speeds can be obtained in the test section (not shown). The source of power to effect movement of these flexible walls is provided by a plurality of spaced jacks 6 which are connected with fixed structure 7, and to the outer surface of the walls through the linkage of this invention. There may be one or more jacks at each laterally spaced location, the ends of which engage a cross beam 8 extending transversely of the nozzle and substantially parallel to the flexible walls. Each beam is connected through a plurality of transversely spaced linkage arrangements 9, which comprise the novel features of this invention, to the outer surface of the flexible nozzle wall. The fixed outer portions of the jacks may be mounted on outer beams 10 which also extend transversely of the nozzle and parallel to the flexible walls. The fixed structure 7 pivotally carries the outer beams through suitable bearing connections 11. With such an arrangement, as the jacks are extended or retracted the wall contours are varied so that the nozzle is given a desired configuration which will provide the Mach number necessary for testing purposes. The pivotal connection 11 between the beams 10 and the fixed structure is necessary to allow the jacks to tilt as the flexible walls are given various contours. This means of course that the jacks will not at all times be exerting a force normal to the wind tunnel wall, but will be at some angle relative thereto. The tilting of the jacks will cause the vertical axis of beams 8 to pivot through an angle X (see Fig. 3) which will result in a lateral component of force on the connecting linkage.

In Fig. 3 the means for connecting the various jacks to the wind tunnel wall can be seen in enlarged fragmentary form. The inner edge of beam 8 is provided with a lug 12 bolted thereto which, through pin 13, pivotally engages the central portion of a bar or beam 14 of the connecting linkage 9. On one side of connection 13 of bar 14 a single link 16 is pivotally connected thereto as may best be seen in the sectional view of Fig. 4. Pin 17 is received by bar 14 and through suitable bearings 18 rotatably engages the two segments of link 16. This link extends perpendicularly relative to flexible wall 3, carrying bearings 18 which pivotally engage a second pin 19. Lug 20 supports this pin, and these elements are screwed to the outer side of the flexible wall by means of three aligned screws 21, threadably received in openings in the outer wall surface. Only a narrow portion of lug 20 contacts the wall. In the position shown the axis of link 16 is substantially in alignment with the axes of screws 21 which hold lug 12 to the wind tunnel wall, being normal thereto.

On the opposite side of connection 13 of lug 12 to bar 14 is a double pin-joint link arrangement wherein links 23 and 24 are pivotally connected by laterally spaced pins 25 and 26 to the bar. These two links converge toward the wind tunnel wall and by laterally spaced pins 27 and 28 are pivotally connected to a lug 29. The latter lug connects to the wind tunnel wall by means of aligned screws 30 threadably received in the outer surface of the wind tunnel wall. These connections are generally similar in arrangement to those for link 16, and again only a small portion of the lug touches the wall. The pivotal connections of the links 23 and 24 to bar 14 and to the lug 29 are arranged whereby the projected axes 31 and 32 of these links intersect substantially at the location where the axes of screws 30 cross the neutral axis 33 of wind tunnel wall 3. Preferably the threaded connection of screws 30 to wall 3 occurs substantially at this axis of the wall rather than near the outer surface thereof. This axis of the flexible wall, according to well known principles of mechanics, lies along the intersection of a cross section and the plane of neutral stress. The latter plane falls between the portion of the wall which is under compression by reason of its bending, and that which is under tension from the bending. Accordingly, the neutral axis 33 at the location of each lug connection is substantially along the center of the wall and parallel to the outer surfaces thereof.

By the arrangement thus shown and described a screw-type lug connection is permitted yet screws of a minimum size can be used. Forces are exerted against the wall from the jack to beam 8, and transmitted through bar 14 to the links and lugs. Forces normal to the flexible wall 3 can be taken by the single link 16 as well as the double link arrangement on the opposite side of the bar. Lateral forces can be absorbed only by the double link arrangement due to the pivotal connection between the single link and the bar 14 and the wall. Because the double links are convergent toward the wall there will be no pivoting thereof due to lateral forces on bar 14. These forces can only be applied through the axes of the links because of the pin-joint connections, and therefore are taken in every case through the neutral axis of the wall 3. This results because the double links converge so that their axes intersect at the location of this neutral axis. Also, the screws 30 connecting lug 29 to the plate cross the neutral axis of the flexible wall at this same location. As a result the screws are required to take no localized bending force. This means that screws of small size can be used without danger of failure. In one installation wherein a test section seven feet by seven feet is provided, screws of only 5/16 of an inch diameter can be used for these connections. The threads, located near the neutral axis, have very low stresses thereon. The holes required in the highly stressed flexible wind tunnel wall are very small. Complete flexibility and bending of the wall are permitted because of the small screws in the wall, and the narrow portions of the lugs in contact with the wall, which permit all of the inner surface of the wall to bend. A wind tunnel wall of minimum thickness results, less machining is necessary and the use of a welded lug is avoided.

It is not necessary to use three screws for holding the lugs to the wall, as illustrated in the preferred embodiment. One or more screws may be used and of course the relationship with the neutral axis must be maintained for the dual link connection.

It is therefore apparent that I have provided an improved connection for a flexible wind tunnel wall whereby screw type lugs having small size screws can be permitted without danger of over-stressing and without sacrifice of flexible wall properties.

The foregoing detailed description is to be clearly understood as given by way of illustration and example only, the spirit and scope of this invention being limited only by the appended claims.

I claim:

1. In combination with a flexible wind tunnel wall a device for applying force to said wall to vary the contour thereof, said device comprising a first lug, a first threaded means holding said first lug to said wall, a second lug laterally spaced from said first lug, a second threaded means holding said second lug to said wall, beam means spaced from said wall, a pin-joint link axially aligned with said first threaded means and interconnecting one side of said beam means and said first lug, two pin-joint links interconnecting the other side of said beam means and said second lug, said two pin-joint links being convergent from said beam means whereby the projected axes thereof intersect substantially where the axis of said second threaded means crosses the neutral axis of said wall, and means intermediate said sides of said beam means for transmitting force against said beam thereby to change the contour of said wall.

2. A device for moving a flexible wind tunnel wall comprising a duality of laterally spaced lugs bolted to said wall, the bolted connection of at least one of said lugs extending substantially to the neutral axis of said wall, a force transmitting member laterally spaced from said wall, a duality of links pivotally interconnecting said force transmitting member and a lug the bolted connection of which extends to the neutral axis of said wall, said duality of links being inclined with respect to said wall whereby the projected axes thereof intersect at the juncture between the neutral axis of said plate and the bolted connection of said lug, and a link pivotally interconnecting the other of said lugs and said force transmitting member with the axis thereof substantially normal to said wall.

3. A device for moving a flexible wind tunnel wall comprising a bar member laterally spaced from said wall, a first lug, screw means normal to said wall and extending to the neutral axis thereof fastening said first lug thereto, a duality of links pivotally engaging said first lug and said bar member, said duality of links being inclined with respect to said wall so that the projected axes thereof intersect substantially at the intersection of the neutral axis of said wall and said screw means, a second lug, a second screw means threadably received by said wall and normal thereto securing said second lug to said wall, a second link pivotally engaging said bar member and said second lug with the axis thereof substantially in alignment with the axis of said second screw means, and force transmitting means engaging said bar member intermediate the connection of said links thereto whereby forces on said bar member are applied to said wall at the neutral axis thereof.

4. In a wind tunnel having a flexible wall, an arrangement for moving said wall comprising jack means, a bar substantially parallel to said wall and pivotally connected to said jack means, a link pivotally connected to said bar on one side of said jack means and projecting in the opposite direction therefrom, a lug, a screw threadably received in said wall for securing said lug thereto, said link being pivotally connected to said lug with the axis thereof substantially in alignment with the axis of said screw, a duality of links pivotally connected to said bar on the opposite side of said jack means and projecting in the opposite direction therefrom, a second lug, a second screw means securing said second lug to said wall and extending to the neutral axis thereof, said duality of links being pivotally connected to said second lug at laterally spaced locations with the axes of said duality of links convergent towards said lug and the projections of said axes of said duality of links intersecting substantially at the location where the axis of said second screw means intersects the neutral axis of said wall.

5. A device for moving a flexible wind tunnel wall comprising a force exerting means on the outer side of said wall, and means interconnecting said force exerting means and said wall, said interconnecting means including a bar laterally spaced from and substantially parallel to said wall, the central portion of said bar being pivotally connected to said force exerting means, a duality of pin-joint links pivotally connected to said bar at one end thereof, a first lug pivotally connected to said duality of links, screw thread means holding said first lug to said wall and crossing the neutral axis of said wall, said connections for said duality of links and said first lug being arranged whereby said duality of lugs are convergent away from said bar and the projections of the axes thereof intersect substantially at the location where said screw thread means crosses the neutral axis of said wall, a single pin-joint link connected to said bar at the opposite end thereof, a second lug pivotally engaging said single pin-joint link, and screw thread means holding said second lug to said wind tunnel wall with said single link substantially normal to said wall.

6. A device for bending a flexible wind tunnel wall comprising a force transmitting bar member laterally spaced from said wall, a duality of links pivotally connected to said bar at laterally spaced locations and convergently projecting therefrom, a first lug at least one screw holding said first lug to said wall, said screw being normal thereto and threadably received by said wall, extending into said wall to the location of the neutral axis thereof, said first lug being pivotally connected to said duality of links at laterally spaced locations so that the projected axes of said links intersect said neutral axis at said location where said screw extends to said neutral axis, a single link pivotally connected to said bar remote from said duality of links, a second lug, and at least one screw holding said second lug to said wall, said screw for said second lug being normal to said wall, said second lug being pivotally connected to said second link so that said second link is normal to said wall and the axis thereof is in alignment with said screw for said second lug, whereby forces on said bar normal to said wall are transmitted to said wall through all of said links and lateral forces on said bar are transmitted only through said duality of links to said wall at the neutral axis thereof.

References Cited in the file of this patent
UNITED STATES PATENTS

| | | |
|---|---|---|
| 2,472,949 | Jackson | June 14, 1949 |
| 2,560,634 | Colley | July 17, 1951 |
| 2,625,008 | Crook | Jan. 13, 1953 |
| 2,663,322 | Allen | Dec. 22, 1953 |